Jan. 14, 1964  W. C. BROEKHUYSEN  3,117,449
THERMALLY RESPONSIVE ELEMENT
Filed Feb. 5, 1962
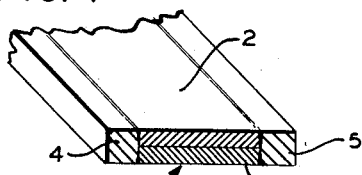
FIG. 1
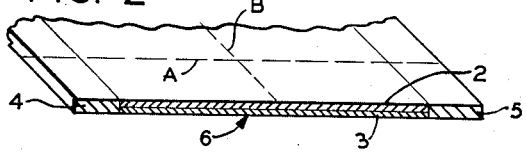
FIG. 2
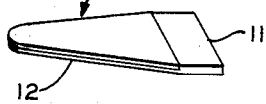
FIG. 3
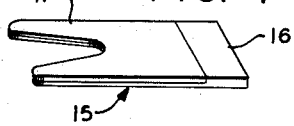
FIG. 4
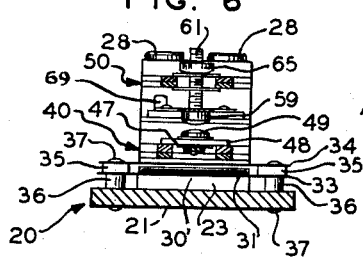
FIG. 6
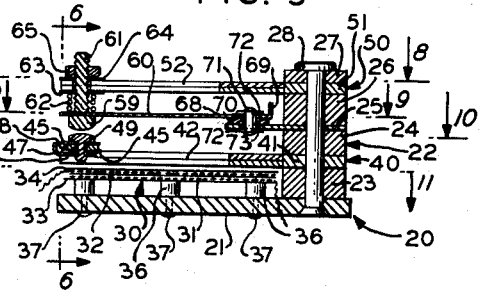
FIG. 5
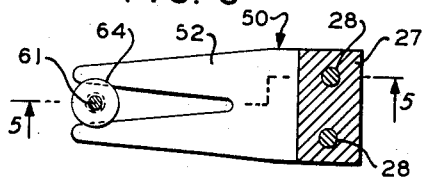
FIG. 8
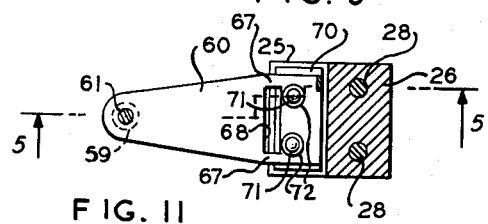
FIG. 9
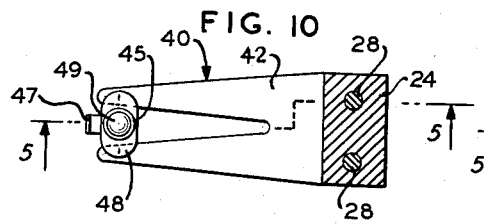
FIG. 10
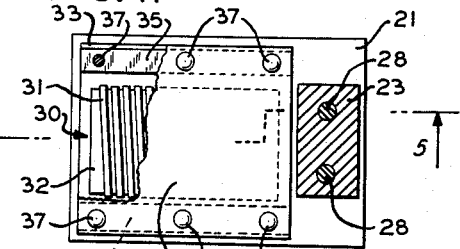
FIG. 11
FIG. 7
INVENTOR.
WILLIAM C. BROEKHUYSEN
BY *Charles T. Cobb*
ATTORNEY

United States Patent Office

3,117,449
Patented Jan. 14, 1964

3,117,449
THERMALLY RESPONSIVE ELEMENT
William C. Broekhuysen, New York, N.Y., assignor to G-V Controls Inc., Essex County, N.J., a corporation of New Jersey
Filed Feb. 5, 1962, Ser. No. 171,240
12 Claims. (Cl. 73—363.5)

This invention relates to a thermally responsive element, and more particularly to such an element constituted and mounted to result in efficient action of improved stability.

A common form of thermally responsive element, widely used in various thermally responsive devices, such as thermostats, thermal relays and the like, is a layered multimetallic element—i.e., an element composed of two or more layers, of metals of dissimilar thermal coefficients of expansion, bonded together—of which the most common example is a bimetallic element. Such a multimetallic element is usually flat at some particular temperature; as the temperature is changed, however, the unequal expansions or contractions of its several layers cause the element as a whole to curve in one or the opposite direction, depending on whether the change is an increase or a decrease.

It is common to secure a portion, for example an end portion, of such an element to a base or support, leaving a free portion whose thermally induced curvature is used to effect some desired result such for example as opening or closing a pair of contacts at some particular or "operating" temperature. When such an element thus secured is repeatedly subjected to temperatures substantially above and below the operating temperature for which the device in which it is incorporated has been adjusted, however, it is almost invariably found that the operating temperature shifts or drifts considerably—in other words that the element, and thus the device of which it forms a part, is unstable. The instability is usually capable of being progressively reduced to some minimum value by a "stabilizing" treatment consisting of long-continued cycling of the device between temperatures substantially higher and substantially lower than the extremes of the temperature range to which the device will be exposed in use. This is, however, a time-consuming and costly process, the minimum degree of instability which is thereby reached may remain unfavorably high and, possibly worst of all, just how high that residual degree is cannot be readily determined.

One of the principal causes of this instability appears to be the very high forces developed during temperature change within the secured portion of the element, which portion attempts to engage in curvature just as does the free portion, and there are known various expedients which may be used to reduce somewhat the magnitude of this curvature of the secured portion. One of these is the channeling of the secured portion, as by ribbing it. Another is the weakening of the secured portion, as by notching or grooving it from above, from below and/or from the sides. Another involves securing by a clamp which presents to the element a concave surface so that the clamping is along lines only rather than over a whole surface. All these expedients, beside being troublesome, are of rather limited effectiveness, and moreover the second and third tend unfavorably to increase the susseptibility of the element and device to external vibratory forces or shock which may be imposed on them by the environment in which they are required to operate. Still another expedient, of greater effectiveness but involving a disastrous increase of susceptibility to externally imposed vibratory forces and shock, is the complete removal from the secured portion of all but one of the layers of the element.

Both the instability and the shortcomings of several of the expedients mentioned above increase sharply with reduction of size of the element, such as is very often required by space limitations.

It is an object of my invention to minimize the instability mentioned above. It is an object to do so in a more effective manner than results from any expedient heretofore known. It is an object to do so without increasing the susceptibility of the element or device to externally impose vibration and shock. It is an obect to do so especially for the case of elements which are required to be small.

It is an object greatly to reduce any requirement for stabilizing treatment of the element.

It is an object to provide a temperature-responsive element, with mounting therefor, which will be initially very stable and will require no prolonged stabilizing treatment. It is an object to provide such an element characterized by a high energy output. Additional objects are to maintain in such an element a fast response and a high natural frequency of vibration.

Other and allied objects will appear from the following description and the appended claims.

According to the invention the thermally responsive element has a monometallic portion fixed to the support and a layered multimetallic portion contigous to and extending from that monometallic portion, both being of essentially the same thickness at least where contiguous. According to particular preferred aspects, the thermal coefficient of expansion of the monometallic portion is essentially equal to that of the support; that portion is rigidly fixed in the support; the line of contiguity of the portions is at least substantially aligned with the surface of the support, so that the monometallic portion only, but the entirety of that portion, is fixed in the support. According to other particular preferred aspects the multimetallic portion extends from the monometallic portion in cantilever; it has an effective width which progressively reduces with increasing distance from the monometallic portion. Other features appear hereinafter.

In the description reference is made to the drawing, in which:

FIGURE 1 is a perspective view showing, at an intermediate stage in its fabrication, strip stock useful in the practice of my invention;

FIGURE 2 is a perspective view showing such strip stock in final form;

FIGURES 3 and 4 are perspective views respectively showing temperature-responsive elements cut from such stock as that of earlier figures;

FIGURE 5 is a vertical cross-sectional view of a thermally responsive device, specifically a thermal relay, embodying my invention.

FIGURE 5 is a vertical cross-sectional view taken along the line 6—6 of FIGURE 6;

FIGURE 7 is an enlarged view of a portion of FIGURE 6;

FIGURE 8 is a horizontal cross-sectional view taken along the line 8—8 of FIGURE 5 (the line 5—5 in this and later figures indicating the plane along which FIGURE 5 is taken);

FIGURE 9 is a horizontal cross-sectional view taken along the line 9—9 of FIGURE 5;

FIGURE 10 is a horizontal cross-sectional view taken along the line 10—10 of FIGURE 5; and FIGURE 11 is a horizontal cross-sectional view taken along the line 11—11 of FIGURE 5.

My invention involves a temperature-responsive element having both a portion which is of layered multimetallic (for example bimetallic) nature and which is subject to curvature in response to temperature change, and a portion which is monometallic and which is not subject to such curvature. The two portions are contiguous to each other, and are of essentially the same thickness at least at the line of their contiguity. The element is an integral or unitary one, the two portions extending one from the other.

A non-limitative example of a way in which such elements may be formed is provided by FIGURES 1 and 2. Herein the numeral 1 designates bimetallic strip stock, consisting of two layers 2 and 3 respectively of metals of different thermal coefficients of expansion intimately joined together one above the other, before that stock has been rolled down to its final thickness. Each of the side edges of the stock 1 may be dressed to a longitudinally straight condition and to each may be securely bonded, for example by butt-welding, a respective monometallic strip 4 or 5 desirably of essentially the same thickness as that of the stock 1 in its then-existing state. The thus-integrated stock 1—4—5 may then be subjected to further rolling-down to the desired final thickness, resulting in final stock such as that designated as 6 in FIGURE 2. This final stock may then be suitably cut, for example along such lines as those dottedly shown in FIGURE 2 as A and B, to result in rectangular elements such as described above.

FIGURE 2 has indicated a line of division between the monometallic marginal portions resulting from 4 and 5 and both of the layers of the bimetallic portion resulting from 1. It is, however, to be understood that this simply reflects the history of the particular method of fabrication above described; the monometallic portions may in some cases be of metal constituently the same as that of one of the layers of the multimetallic portion, for which cases the unitary or integrated stock might be fabricated by other procedures under which there never would have been any separation between one of those layers and the vertically corresponding parts of the monometallic portions. It is further to be understood that I use the term "metal" and its derivatives in the generic sense under which an alloy, just as well as a chemical element, is a metal; thus the monometallic marginal portions or the layer 2 or the layer 3 may be of an alloy, the layers may be of respective alloys, etc.

As hereinafter appears, it is the monometallic portion which according to the invention is secured to—preferably clamped or otherwise rigidly bound in—a support, with the multimetallic portion extending therefrom. Typically the multimetallic portion, which constitutes the active portion of the element, will form a cantilever, of which the free-end region is moved by the thermally induced curvature of the multimetallic portion and is called upon to perform work. The energy available in that movement per degree temperature change is of importance.

The energy is proportional to the product of the distance of free-end movement per degree temperature change when that end is completely free of restraint, by the force per degree temperature change produced at the free end when it is completely restrained. In turn this product is equal to the volume of the active portion of the element multiplied by a constant, that constant depending on the materials from which the active portion is made, on its basic arrangement (that is, whether it is of cantilever, helix, spiral or other arrangement) and, for any basic arrangement such as a cantilever, on its configuration in such respects as uniformity or non-uniformity of its cross section throughout its length.

For an element to be used in a thermally responsive device of restricted size there are obvious limitations on the length and maximum width of the active portion of the element. Furthermore while an increase of thickness will linearly increase the energy per degree, it will do so by increasing on a square-law basis the force per degree while linearly decreasing the distance of movement per degree—and there are ordinarily practical requirements for some minimum distance of movement which tend to set a limitation on thickness. Beside these environmentally imposed limitations there may be a further one that the device in which the element is incorporated shall operate properly in the face of externally imposed vibratory forces of relatively high frequency.

An element whose active portion is of given length and thickness and of given width at its base (i.e., immediately adjacent to the inactive or secured portion of the element) but which is triangular, with its width tapering uniformly from its base to a point at the remote end, is characterized by an energy of free-end movement per degree two-thirds of that of one whose active portion is of similar length and thickness but of uniform width equal to the base width of the first, and by an equal distance of unrestrained movement. At the same time the first is characterized by a fundamental or lowest-mode resonant frequency of over twice that of the second. The net result, for use in a vibratory environment, is a marked superiority of the first or triangular element over the second or rectangular one. The superiority extends to speed of response, which is increased in the first element by reason, among others, of the reduction of thermal capacity to half that of the second. Another and independent superiority is mentioned below.

It is usually not practical to carry the tapering to the limiting case of termination in a point. Further, it is not of great significance whether the tapering start immediately at the base or at a point removed therefrom by some minor fraction of the length of the active portion. Still further, the tapering need be only of the effective width—i.e., it may be accomplished either by removing from an otherwise rectangular shape two triangles respectively containing the remote corners, or by removing a single transversely intermediate triangle or approximate triangle so that the resulting element is a forked one.

From the foregoing it follows that for many purposes a preferred configuration of an element to be cut from such a strip stock as 6 of FIGURE 2 will not be a rectangular one such as would result from cutting along lines A and B of FIGURE 2, but will instead be either a simply tapered one such as the element 10 of FIGURE 3 or a forked one such as the element 15 of FIGURE 4. Each of these will be understood to comprise a monometallic or inactive portion (11 or 16) and a bimetallic or active portion (12 or 17) contiguous therewith and extending therefrom. Purely by way of example of subject matter mentioned above, each element has been shown without any line of demarcation between its monometallic portion and the lower layer of its bimetallic portion, which layer may for example be the one having the greater thermal coefficient of expansion.

In FIGURES 5 through 11 I show a thermally responsive device incorporating in a preferred manner elements such as have been disclosed above. By way of example the device of these figures is a thermal relay, but no unexpressed limitation to a relay is intended.

In these figures a support 20 is formed by a horizontal plate 21 and a stack 22 extending upwardly therefrom. The bottommost member of the stack may be a rectangular spacer 23; above it there is assembled in the stack the monometallic portion 41 of a thermally responsive element 40 from which there extends to the left a bimetallic portion 42 whose lower layer has the higher thermal coefficient of expansion of its two layers. Above the element portion 41 the stack includes a spacer 24, thereabove a plate 25 extending for a short distance leftwardly from the stack, and above the plate 25 a spacer 26.

Above the spacer 26 there is assembled in the stack the monometallic portion 51 of a thermally responsive element 50 from which there extends to the left a bimetallic portion 52 of whose two layers the lower one has the higher thermal coefficient of expansion. Above the element portion 51 the stack includes a spacer 27. The stack finally includes a pair of strong rivets 28 passing through the several other parts of the stack and through the plate 21, all of which are appropriately apertured for the purpose, and serving to clamp the same tightly together.

The lower thermally responsive element 40 is the operating element of the relay of these figures, and for it there is provided a heater 30. While this heater may be of any desired construction and arrangement, it has been illustrated as formed by a winding 31 of resistance ribbon wound about a mica card 32 and positioned slightly below the lowermost position to which the element 40 will normally come. By way of example of mounting arrangements there have been shown below and above the card 32 clamping cards 33 and 34 respectively, also of mica; front and back marginal portions of the cards 33 and 34 may overhang the card 32 and may be suitably separated by thin spacing means 35, and the whole assembly of 31 through 35 may be clamped together and held in proper vertical position by rivets 37 passing through 33, 34 and 35 and plate 21 and holding the assembly on top of suitable short pillars 36 which rest on the plate. In the figures, and especially in FIGURES 5 and 6, the thicknesses and vertical spacings of the components 31 through 35 have been exaggerated in the interest of clearer illustration.

The element 40 carries at its lefthand or free-end region a contact 49, its immediate function being to move that contact upwardly in response to increase of its own temperature by the heater 30. The contact 49 may be secured on top of a small plate 48 which in turn is secured on top of the element 40 and bridges over a void in that element mentioned below; the stem of the contact may pass downwardly through that plate and through a lug 47 therebelow (through which electrical connection may be made to the contact) and may be riveted over against the bottom of that lug, suitable insulating washers 45 and an insulating bushing 46 serving to maintain contact, stem and lug insulated from the plate 48 and thus from the element 40.

To cooperate with the contact 49 there is provided thereabove a contact 59. The latter contact may be secured as by welding to the bottom surface of a spring arm 60 which extends leftwardly from near the stack 22; that arm may for example be assembled to the top of an insulating spacer 70 which rests on the leftwardly extending portion of plate 25, rivets 71 insulated from both that arm and that plate (as by insulating washers 72 and insulating bushings 73) serving to effect that assembly. A small lug 69 formed at the righthand end of the arm 60 may provide for the making of electrical connection to the arm and therethrough to the contact 59. The arm 60, which may be tapered in width toward its lefthand extremity, may be provided near the rivets 71 with a relatively wide aperture 68 so as to leave in that region narrow spring-hinge portions 67 only. A thin threaded rod 61, secured to the arm 60 above the contact 59 and extending upwardly, may form a coupling rod through which the vertical positions of the arm 60 and contact 59 about the hinge portions 67 is normally established.

The function of the upper thermally responsive element 50 is to establish the vertical position of the contact 59, in the absence of heating of the element 40 by the heater 30, at a separation from the contact 49 which, once adjusted to a desired value, is independent of ambient temperature. This function it performs through the coupling rod 61, which may pass upwardly through a suitable void in the lefthand or free-end region of the element 50 to carry thereabove an insulating washer 64 and above that a knurled adjusting nut 65. The arm 60 may be normally biased into the lowermost position permitted by the nut 65, through the medium of a small coil spring 62 encircling the rod 61 and slightly compressed between the top of the arm 60 and an insulating washer 63 immediately below the element 50.

It will be understood that to evoke operation of the relay current will be supplied to the heater winding 31, which will heat the lower element 40 and cause the bimetallic portion of that element progressively to curve and to carry its contact 49 upwardly and into abutment against the contact 59; the length of time elapsing from the inception of the current supply until this closure of the contacts 49 and 59 is of course a function of the initial spacing between those contacts which has been established by the adjustment of nut 65. After the contact closure the further supply of current to the winding 31 will result in some further curvature of the element portion 42 and some further upward movement of the contact 49, which will be accompanied by upward movement of the contact 59, a swinging of arm 60 about its hinge portions 67, and a further compression of spring 62. Upon the cessation of supply of current to the winding 31 the element 40 will cool and the parts will gradually restore themselves to the illustrated condition.

The typical thermally responsive device and its operation having been thus described, particular attention may now be given to the elements 40 and 50 and their mounting. First, it may be noted that the multimetallic or bimetallic portions 42 and 52 of those elements are of effectively tapered width. In order to provide voids accommodating the lug 47 in the case of the element 40 and the coupling rod 61 in the case of the element 50, the elements may be forked as disclosed above in connection with FIGURE 4; the approximate triangle removed in that forking in order to provide a void of optimum width for its function may, however, be less wide than in FIGURE 4, so that it may be desirable to augment the effective tapering by some progressive reduction of width of the element toward the free end, as was disclosed in less restricted degree as the sole tapering expedient in connection with FIGURE 3.

Secondly, the monometallic portions 41 and 51 of the elements 40 and 50 are desirably secured to the support 30 by being rigidly fixed therein, and it is for that reason that they have been shown securely clamped in the stack 22. In order that their fixing be as rigid as possible, it is desirable that all parts of the stack be of smoothly surfaced metal, as has been illustrated.

Thirdly, these monometallic portions are desirably of metal having essentially the same thermal coefficient of expansion as that of the support to which they are secured—more specifically, as that of the stack 22 in which they are clamped. It is therefore in turn desirable that the several portions of the stack have the same coefficient of expansion. In practise it is frequently convenient to meet these two specifications by forming the several parts of the stack of the same metal as that used for the monometallic element portions—which in turn may, though are not required to, be of the same metal as that used for the high-expansion (lower) layers of the bimetallic portions.

Fourthly, in each of the elements 40 and 50 the line of contiguity of its monometallic and multimetallic portions (i.e., the line at which those portions are contiguous to each other) is desirably at least substantially, and preferably quite accurately, aligned with the surface of the support (e.g., with the left-hand surface of the stack 22), as has been shown in FIGURE 5. This results in the entirety of the monometallic portion being fixed in the support, and the entirety of the multimetallic portion being free of such fixing.

I have found that an element which comprises monometallic and bimetallic portions and is secured to its support in obedience to the specifications of the last three preceding paragraphs is initially many times as stable as one conventionally constituted and secured, requires no appreciable stabilizing treatment, and will continue indefinitely to produce far more uniform results than will the conventional element even after the latter has been subjected to prolonged stabilizing treatment. This contrast is greatest in the case of elements with relatively low length-to-thickness ratios, but remains substantial even at larger ratios.

The superiority of the former element flows from the absence of generation of curving forces within the secured portion. In this connection it is to be borne in mind that such forces in the case of a conventional and conventionally secured element attempt to cause curvature of the secured portion not only lengthwise of the element (i.e., as would be seen in FIGURE 5) but also transversely (i.e., as would be seen in FIGURE 6). The superiority might therefore be expected to be, and I have found that it is, especially marked in elements whose secured portions are of substantial width.

The advantages are not limited to the curvature foreclosed or permitted, as the case may be, within the secured portion; they extend to the behavior of the free portion as well, which also undertakes to curve transvesrely of the element—with a resultant longitudinal stiffening against longitudinal curvature, to the detriment of the distance and force of the intended free-end movement. When the secured portion is prevented from curving transversely not only in the imperfect manner which results from its merely being secured but also in the more positive manner which results from its being monometallic, curving of the free portion in its regions near the secured portion—which are of course closely coupled to that secured portion—is substantially lessened. In this connection the fact that the secured portion is of the full thickness of the free portion, rather than of the thickness of one of its layers only, is of especial significance, since it renders the secured portion both far stiffer and more closely coupled to the nearby regions of the free portion.

The beneficial effect mentioned in the preceding paragraph is most significant in the regions of the free portion relatively near the secured portion. On the other hand the tapering of effective width, disclosed above to have several advantages there set forth, has the independent advantageous effect of progressively reducing in those more remote regions the transverse dimension capable of being curved and thus the degree of harmful longitudinal stiffening in those more remote regions. The combination of the two effects nicely reduces the harmful transverse curvature and longitudinal stiffening in all regions of the free portion; that combination of effects is of course achieved in the structure of FIGURES 5 through 11.

This application is in part a continuation of my copending application Serial No. 167,570, filed January 22, 1962.

While I have disclosed my invention in terms of particular embodiments thereof, it will be understood that I intend thereby no unnecessary limitations. Modifications in many respects will be suggested by my disclosure to those skilled in the art, and such modifications will not necessarily constitute departures from the spirit of the invention or from its scope, which I undertake to express in the following claims.

I claim:

1. In combination with a support, a temperature-responsive element having a monometallic portion fixed to said support and a layered multimetallic portion contiguous to and extending from said monometallic portion and subject to curvature in response to temperature change, said portions being of essentially the same thickness at least at the line of their contiguity.

2. The subject matter set forth in claim 1 wherein said monometallic portion has a thermal coefficient of expansion essentially equal to that of said support.

3. The subject matter set forth in claim 1 wherein said monometallic portion is fixed in said support.

4. The subject matter claimed in claim 3 wherein the fixation of said monometallic portion in said support is a rigid fixation.

5. The subject matter claimed in claim 4 wherein said monometallic portion is rigidly clamped in said support.

6. The subject matter set forth in claim 1 wherein said monometallic portion is fixed in said support and the line of contiguity of said portions is at least substantially aligned with the surface of said support.

7. The subject matter set forth in claim 1 wherein said monometallic portion only, but the entirety of that portion, is fixed in said support.

8. The subject matter set forth in claim 1 wherein said multimetallic portion extends from said monometallic portion in cantilever.

9. The subject matter set forth in claim 1 wherein said multimetallic portion extends from said monometallic portion in cantilever and throughout at least a substantial part of its length has an effective width which progressively reduces with increasing distance from said monometallic portion.

10. The subject matter claimed in claim 1 wherein said multimetallic portion is bimetallic.

11. The subject matter set forth in claim 1 wherein said monometallic portion is of metal constituently the same as the metal of one of the layers of said multimetallic portion.

12. The subject matter as forth in claim 1 further including a pair of contacts moved relatively to each other by the curvature of said multimetallic portion.

References Cited in the file of this patent

UNITED STATES PATENTS

| | | |
|---|---|---|
| 150,566 | Guest | May 5, 1874 |
| 260,651 | Brush | July 4, 1882 |
| 314,027 | Johnson | Mar. 17, 1885 |
| 1,124,788 | Nash | Jan. 12, 1915 |
| 1,916,669 | Kuhn | July 4, 1933 |